(12) United States Patent
Burtz et al.

(10) Patent No.: US 7,333,893 B2
(45) Date of Patent: Feb. 19, 2008

(54) METHOD FOR SPATIALLY INTERPRETING ELECTROMAGNETIC DATA USING MULTIPLE FREQUENCIES

(75) Inventors: Olivier M. Burtz, Houston, TX (US); James J. Carazzone, Houston, TX (US); Dmitriy A. Pavlov, The Woodlands, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 63 days.

(21) Appl. No.: 11/360,303

(22) Filed: Feb. 23, 2006

(65) Prior Publication Data

US 2006/0217889 A1    Sep. 28, 2006

Related U.S. Application Data

(60) Provisional application No. 60/659,251, filed on Mar. 7, 2005.

(51) Int. Cl.
    *G01V 9/00*    (2006.01)
    *G01V 11/00*   (2006.01)
(52) U.S. Cl. .................. 702/14; 702/7; 702/16
(58) Field of Classification Search ............ 702/2, 702/5, 7, 16
    See application file for complete search history.

(56) References Cited

U.S. PATENT DOCUMENTS

| 4,070,612 A | * | 1/1978 | McNeill et al. ............ 324/334 |
| 4,617,518 A |   | 10/1986 | Srnka et al. ................. 324/365 |
| 5,059,907 A | * | 10/1991 | Sherman ..................... 324/323 |
| 5,666,057 A | * | 9/1997 | Beard et al. ................. 324/339 |
| 5,777,476 A | * | 7/1998 | Papadopoulos ............. 324/334 |
| 6,603,313 B1 |  | 8/2003 | Srnka ........................ 324/354 |
| 6,717,411 B2 | * | 4/2004 | Ellingsrud et al. .......... 324/334 |
| 7,126,338 B2 | * | 10/2006 | MacGregor et al. ........ 324/334 |
| 2005/0077902 A1 | * | 4/2005 | MacGregor et al. ........ 324/334 |

FOREIGN PATENT DOCUMENTS

GB    2382875 A   *   6/2003

OTHER PUBLICATIONS

Ellingsrud, S. et al. (2002) "Remote Sensing of Hydrocarbon Layers by Seabed Logging (SBL): Results from a Cruise Offshore Angola", The Leading Edge 21, 972-982.
Kaufmann, A. A. and Keller, G. V. (1983) Frequency and Transient Soundings, Elsevier, N. Y., XVII-XXI, 213-314, 411-450, 621-678.
Keller, G. V. and Frischknecht, F. C., (1966) Electrical Methods in Geophysical Prospecting, Pergamon Press, 90-196 and 299-353.

(Continued)

*Primary Examiner*—Donald E McElheny, Jr.
(74) *Attorney, Agent, or Firm*—ExxonMobil-URC Law Department

(57) ABSTRACT

Method for removing effects of shallow resistivity structures in electromagnetic survey data to produce a low frequency resistivity anomaly map, or alternatively imaging resistivity structures at their correct depth levels. The method involves solving Maxwell's electromagnetic field equations by either forward modeling or inversion, and requires at least two survey data sets, one taken at the source frequency selected to penetrate to a target depth, the other a higher frequency able to penetrate only shallow depths.

13 Claims, 3 Drawing Sheets
(1 of 3 Drawing Sheet(s) Filed in Color)

OTHER PUBLICATIONS

Newman G.A., Alumbaugh D.L. (1996) Three dimensional Electromagnetic Modeling and Inversion on Massively Parallel Computers, Sandia Report SAND96-0582 Sandia National Laboratories.

Olm, M.C. (1981) Electromagnetic Scale Model Study of the Dual frequency Differencing Technique: M. Sc. thesis, Colorado School of Mines, Pergamon Press, N. Y.

Spies, B. R. (1989) "Depth of Investigation in Electromagnetic Sounding Methods", Geophysics 54, 872-888.

Zhdanov, M. S, and Keller, G. V. (1994) The Geoelectrical Methods in Geophysical Exploration, Elsevier, N. Y., 347-450, 585-674, 692-701.

EP Search Report No. RS112492, dated Aug. 3, 2005, 1 pg.

* cited by examiner

METHOD FOR SPATIALLY INTERPRETING ELECTROMAGNETIC DATA USING MULTIPLE FREQUENCIES

This application claims the benefit of U.S. Provisional Patent Application No. 60/659,251 filed on Mar. 7, 2005.

FIELD OF THE INVENTION

This invention relates generally to the field of geophysical prospecting and, more particularly, to electromagnetic prospecting. Specifically the invention is a method for interpretation of data gathered with controlled source electromagnetic surveys in offshore environments (where a controlled electromagnetic transmitter is towed above electromagnetic receivers fixed on the sea floor).

BACKGROUND OF THE INVENTION

In controlled source electromagnetic ("CSEM") prospecting, the electric and magnetic fields measured by the receivers are then analyzed to determine the electrical resistivity of the earth structures (subsurface formations) beneath the surface or seafloor, because the resistivity, is known to be strongly related to the pore fluid type and saturation. See, for example, U.S. Pat. No. 6,603,313 to Srnka.

The bulk electrical resistivity of reservoirs is often increased substantially when hydrocarbons are present. The increase can be of the order of 100's to 1000's of percent. However, increased formation resistivity alone may not uniquely indicate hydrocarbons. For instance, carbonates, volcanics, and coals can also be highly resistive. Nevertheless, spatial correlation of high formation resistivity with potential traps imaged by seismic or seismic attribute data provides strong evidence of the presence of oil or gas and valuable information on their concentrations.

Recent CSEM surveys have shown that shallow resisitivity in the earth can mask the electromagnetic responses of resistive hydrocarbons that are buried more deeply in the earth (a false negative). Conversely, shallow resistivity can be mis-interpreted to indicate the presence of deeper reservoir resistivity (a false positive).

The conventional method of interpreting marine controlled-source electromagnetic (CSEM) data is to compare the observed electromagnetic response to a selected, reference experiment at a unique frequency (typically ¼ Hz). The reference experiment is supposed to represent the background resistivity; any differences seen between the observed data at other locations and the reference data are interpreted as resistivity anomalies (S. Ellingsrud et al., *The Leading Edge* 21, 972-982, October 2002). The frequency is chosen to produce an optimal response of resistivity anomalies at the reservoir depth. Unfortunately, this frequency is also sensitive to shallower anomalies and these shallower anomalies can hide (or be mistaken for) deeper anomalies.

For instance, FIG. 1 shows the resistivity anomalies from a synthetic marine CSEM survey example where a frequency of ¼ Hz was used with a background resistivity of 1 Ohm-m. The reference experiment is located at 4 in a geologic syncline where no resistivity anomaly is present. Anomalies are defined with respect to this reference. If the electromagnetic response recorded at a receiver is close to the data recorded at the reference receiver, a white dot is displayed at the receiver location. A blue dot means that the data look slightly more conductive than the reference and a cyan dot means that the data look slightly more resistive than the reference. Yellow to red to dark-red dots show an increasingly anomalous high resistive behavior with respect to the reference receiver. The prominent mostly red feature 1 on the anomaly map corresponds to a very shallow resistivity anomaly at 6 Ohm-m (channel filled with low-saturation gas). A deeper but still relatively shallow oil-field (40 Ohm-m anomaly) is visible at 2, but the deeper main field 3 is completely hidden by the shallow anomaly overprint.

It is well known to practitioners in the art that the depth of penetration of electromagnetic data depends on the frequency of the signal. The amplitude of the data is attenuated to 1/e (e is the base of natural logarithms) at a distance $\delta=503(R/f)^{1/2}$ where R is the resistivity in Ohm-m, f is the frequency in Hertz and $\delta$ is the skin depth in meters. High-frequency electromagnetic data is rapidly attenuated away from the source and is not sensitive to deep anomalies. Low-frequency data is less attenuated and can penetrate deeper. It is sensitive to both shallow and deep resistivity structure. See, for example, Keller, G. V. and Friscknecht, F. C., *Electrical Methods in Geophysical Prospecting*, Pergamon Press, 90-196 and 299-353 (1966); Olm, M. C., *Electromagnetic Scale Model Study of the Dual frequency Differencing Technique: M.Sc. thesis, Colorado School of Mines*, Pergamon Press, N.Y. (1981); Kaufmann, A. A. and Keller, G. V., *Frequency and Transient Soundings*, Elsevier, N.Y., XVII-XXI, 213-314, 411-450, 621-678 (1983); B. R Spies, *Geophysics* 54, 872-888 (1989); Zhdanov, M. S, and Keller, G. V., *The Geoelectrical Methods in Geophysical Exploration*, Elsevier, N.Y., 347-450, 585-674, 692-701 (1994). These sources are standard references to electromagnetism practitioners; however, they contain little about the art of CSEM exploration in a marine environment, and none of them teach how to determine the effects of shallower electrical resistivity structures on the electromagnetic responses of deeper resistivity targets in marine CSEM surveying. The present invention satisfies this need.

SUMMARY OF THE INVENTION

In one embodiment, the invention is a data-processing method for reducing masking effects of shallow resistivity structures on an electromagnetic survey of a subsurface region, comprising: (a) selecting a first survey data set generated at a first source frequency, said first source frequency having been selected to penetrate only said shallow resistivity structures; (b) selecting a second survey data set corresponding to a second source frequency lower than said first source frequency, thereby revealing deeper lying resistivity structures of the subsurface region as well as said shallow resistivity structures; (c) calculating the shallow resistivity structure by solving electromagnetic field equations using the survey data set generated at the first source frequency; and (d) using the calculated shallow resistivity structure and the electromagnetic data from the second survey to distinguish shallow response from deeper response.

Step (c) can be performed by either iterative forward modeling or by inversion. Some embodiments in which step (c) is performed by forward modeling use the following steps: (a) assuming an initial shallow resistivity structure; (b) calculating a theoretical electromagnetic response for the survey at said first source frequency using electromagnetic field equations and the assumed shallow resistivity structure; (c) comparing the calculated response to said first survey data set; and (d) adjusting the assumed shallow resistivity structure and repeating steps (b)-(d) as necessary until the calculated response agrees with said first survey data set within a pre-selected tolerance. In the inversion approach to step (c), in some embodiments the shallow resistivity structure is predicted by inverting electromagnetic wave equations at said first source frequency to solve for resistivity structure corresponding to acquisition parameters and the electromagnetic data set from said first survey.

In some embodiments, the invention produces a two-dimensional anomaly map with shallow resistivity effects removed or reduced. This is accomplished in some embodiments by: (a) calculating a theoretical electromagnetic response for the survey at said second source frequency using electromagnetic field equations and the calculated shallow resistivity structure; and (b) comparing the calculated electromagnetic response to the second survey data set to remove contributions to the second survey data set caused by the shallow resistivity structure.

In other embodiments, the resistivity structure as a function of depth can be generated, with resolution depending on the number and distribution of source frequencies for which electromagnetic survey data are available. This is accomplished in some embodiments by using the calculated shallow resistivity structure (obtained as described above) and an estimated deeper resistivity structure and following these steps: (a) taking the calculated shallow resistivity structure and supplementing this resistivity model with the estimated deeper resistivity structure to produce an assumed resistivity model covering shallow and deeper regions; (b) calculating a theoretical electromagnetic response for the survey at said second source frequency using the electromagnetic field equations and the assumed resistivity model; (c) comparing the calculated response to said second survey data set; and (d) adjusting the assumed resistivity model and repeating steps (b)-(d) as necessary until the calculated response agrees with said second survey data set within a pre-selected tolerance. This procedure provides a resistivity model with two depth zones corresponding to skin depth of said first and second source frequencies. More zones and better resolution can be accomplished by obtaining survey data for additional source frequencies and repeating the procedure.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention presents a method to interpret electromagnetic data at different frequencies, in a cascaded way. It sequentially uses a range of frequencies to determine the effects of shallower electrical resistivity structures on the electromagnetic responses of deeper resistivity targets in marine CSEM surveying. It reduces the non-uniqueness of the solution and increases the discrimination of resistivity anomalies at different depths. It can be applied both through forward modeling (one embodiment shown in FIG. 3) and through inversion (one embodiment shown in FIG. 4).

Figure 3:
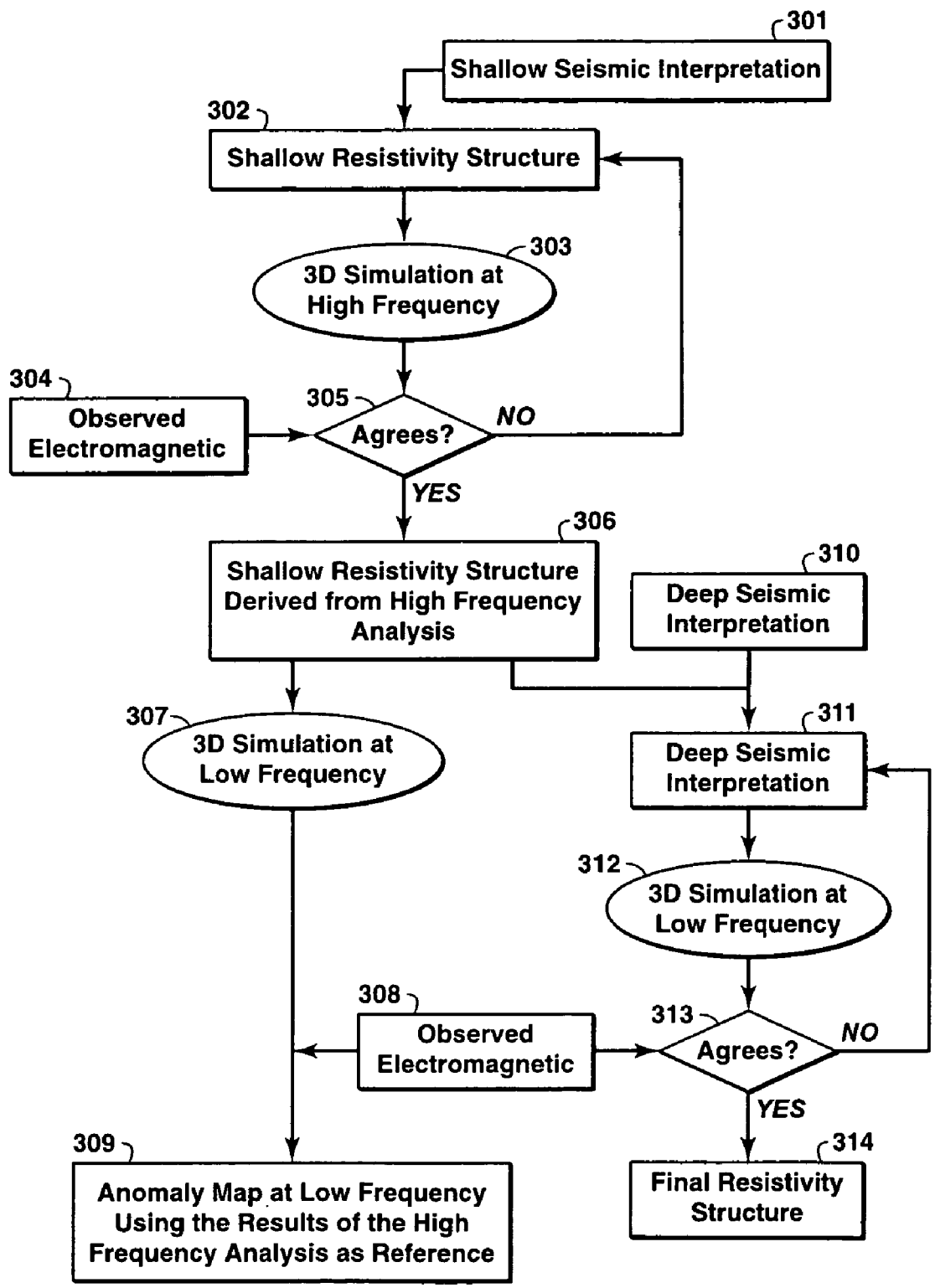
FIG. 3 is a flow chart showing the primary steps of one embodiment of the present invention.
Figure 4:
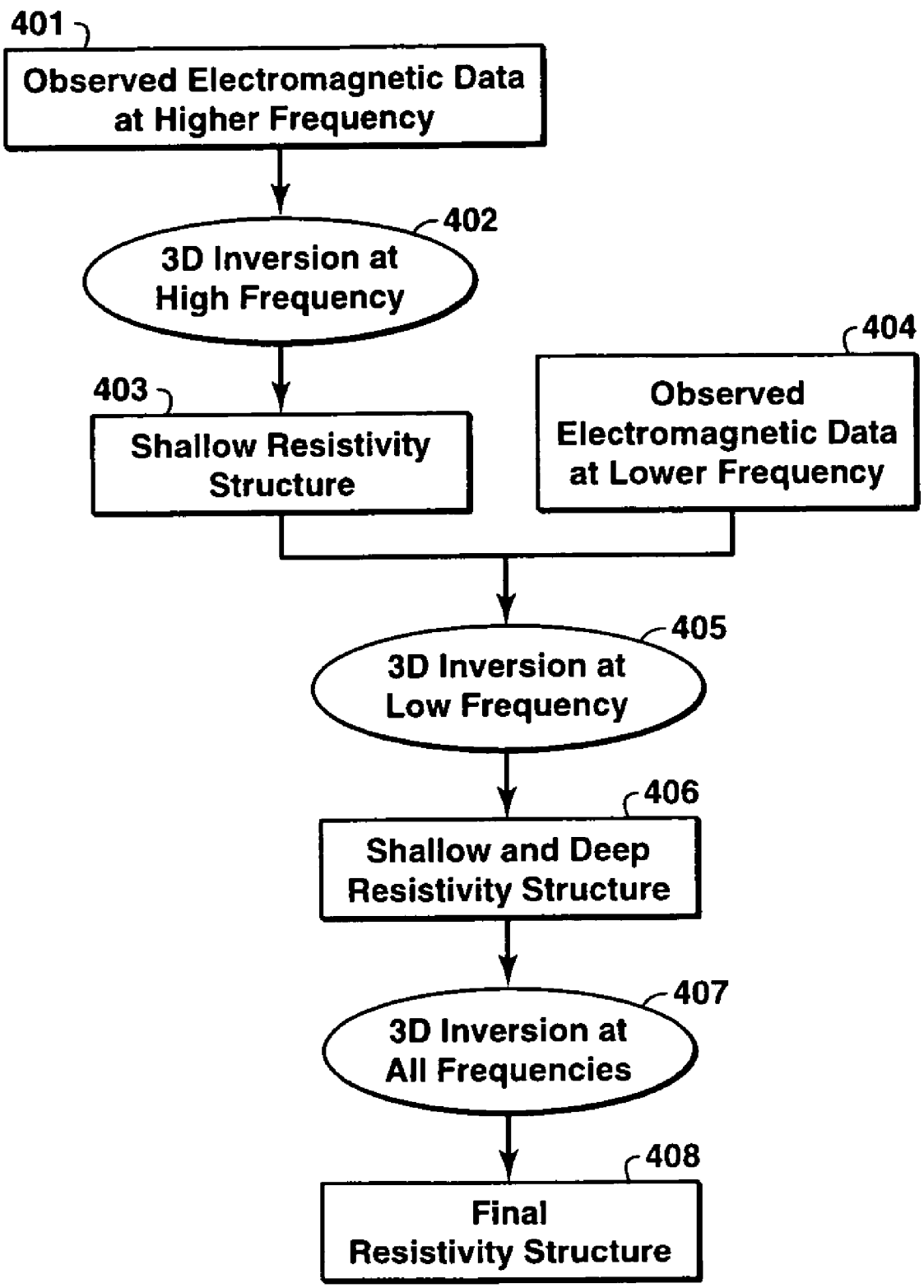
FIG. 4 is a flow chart showing how inversion may be used in the present inventive method instead of forward modeling.

High frequency data (typically higher than 1.5 Hz) are quite sensitive to the shallow resistivity structure. (Because of the skin effect, high frequency radiation cannot penetrate beyond shallow depths.) Referring to the flow chart of FIG. 3, potential shallow resistive bodies can be mapped 302 from the seismic data 301, or failing that, directly from the electromagnetic data (not shown in FIG. 3). The initial shallow resistivity structure can be obtained from seismic data interpretation by associating the resistivity structure with geologic structure identified from seismic reflection, refraction, or transmission data, and then using one or more well-known methods such as seismic impedance-to-electrical resistivity correlation to estimate the resistivity values in the seismically identified structure. Alternatively, the initial shallow resistivity is guessed, or it may be estimated from well log data if available. The electromagnetic response of the model 302 (background resistivity and shallow resistive anomalies) is generated 303 through such 1D, 2D or 3D (FIG. 3 shows 3D) simulation codes as the software products developed by the Consortium for Electromagnetism Modeling and Inversion (CEMI, University of Utah) or the Sandia National Laboratories (*Newman G. A., Alumbaugh D. L., Three dimensional Electromagnetic Modeling and Inversion on Massively Parallel Computers, Sandia Report SAND96-0582 Sandia National Laboratories* (1996)). In essence, these techniques, embodied in computer programs or modules for practical utility, take input information in the form of source position, source waveform, receiver locations and electrical resistivity as a function of location in the subterranean region being surveyed, and solve Maxwell's equations to yield the resulting electric and magnetic fields (sometimes referred to as the electromagnetic response) at the receiver locations for each source position. While sophisticated calculations, the person of skill in the art will need no further guidance on how to access means for performing them. The simulated high-frequency data are compared 305 to the observed high-frequency electromagnetic data 304 (actual data). The shallow resistivity in the model 302 can then be decreased or increased to better fit the actual data. The loop 302 to 305 is repeated until satisfactory agreement is reached between the simulated and the actual data. To reduce the non-uniqueness of the solution, it is preferable to use as much data as possible: electric and magnetic fields of on-line data (the receivers are very close to the transmitter tow-line) and off-line data (the receivers are off the transmitter tow-line).

Figure 2:
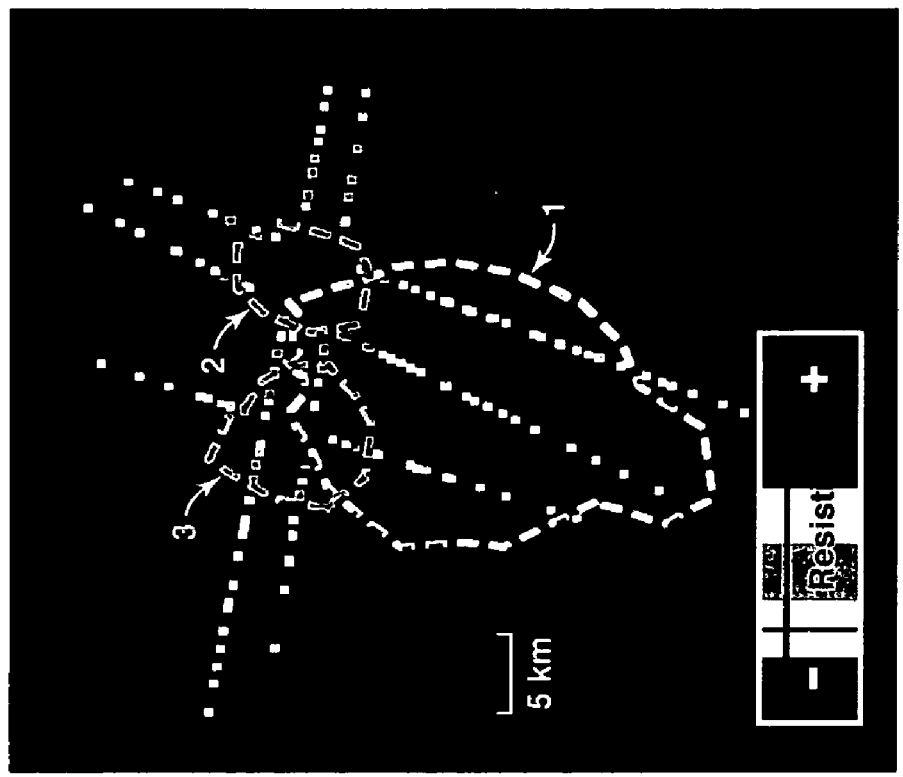
FIG. 2 illustrates the same resistivity anomalies as in FIG. 1 after processing by the present inventive method.

Once a good agreement 305 is reached between simulated and actual data at high frequency, the corresponding resistivity model 306 is simulated at the next set of low frequencies. According to the present invention, this simulation 307 produces the reference electromagnetic data to compare to the actual low-frequency data 308. Any discrepancy corresponds to a true, deeper resistivity anomaly (i.e. something that cannot be explained by shallow geology), and can be plotted on an anomaly map 309 such as FIG. 2. The anomaly mapping 309 at the lower frequency is then meaningful. FIG. 2 shows the data of FIG. 1 after the present inventive method has been applied, i.e., after the calculated shallow contribution has been removed from the observed electromagnetic data. The anomaly map of FIG. 2 shows the extent of the deeper oil fields 3 (now evidenced by red and yellow dots) while the imprint of the shallower, uneconomical anomaly 1 has been removed. The intermediate-depth oil field 2 (it is too deep to be considered as a shallow anomaly, and is not included in the model 306) is still visible. This process of adjusting the shallow resistivity first and simulating the result at low frequency to interpret the actual low-frequency data dramatically improves the mapping of deeper anomalies compared to what would be obtained by omitting the loop 302 to 305 and simply looking at the low-frequency information (FIG. 1, the conventional way to interpret electromagnetic data).

Figure 1:
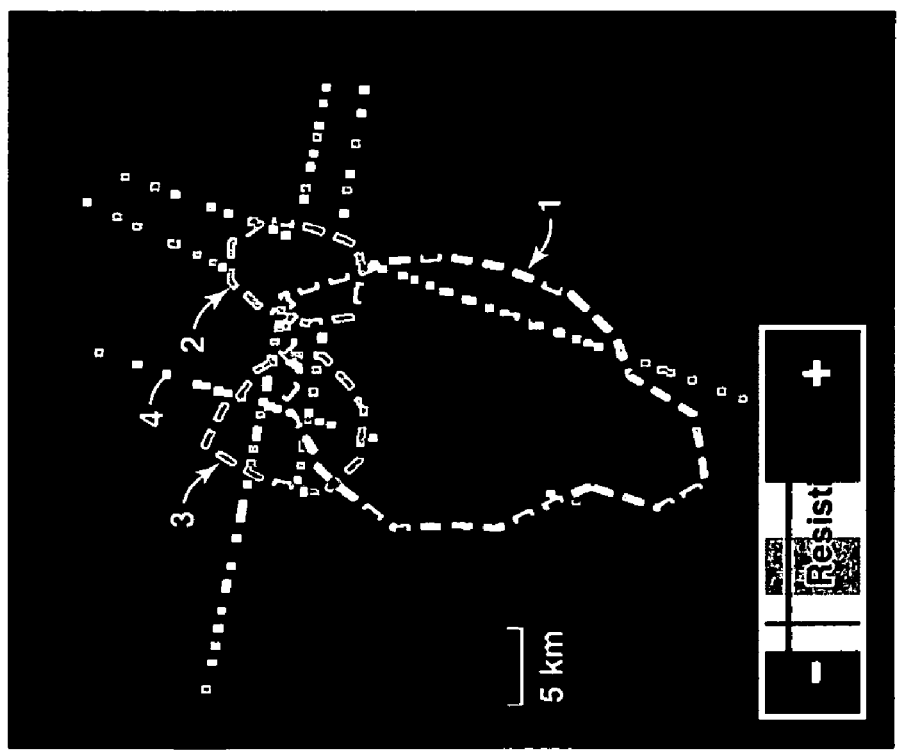
FIG. 1 illustrates a deep resistivity anomaly hidden by shallow anomalies.

In both FIG. 1 and FIG. 2, the amplitude data at low frequency are scaled by the reference data. Such scaling is how the masking effect of the shallow anomaly 1 is removed in the particular embodiment of the invention that produced the anomaly map of FIG. 2. In this embodiment, the scaling was accomplished by dividing the observed amplitude 308 at a given x,y location by the amplitude 307 simulated at the same location. Instead of simple division, other ways to scale to the reference will be obvious to the person skilled in the art. In the conventional approach of FIG. 1, the reference amplitude that the measured data were divided by to scale them was the measurement taken at a single location, i.e., the reference signal is assumed to be a constant background and not position-dependent. Thus, in both drawings, the numbers represented in color are dimensionless numbers. In the color scale selected for FIGS. 1 and 2, red indicates that the actual data is much more resistive than the reference. A person skilled in CSEM work will understand how to determine if measured data indicate more or less resistance than the corresponding reference. In essence, more signal implies less attenuation corresponding to more resistance. Yellow denotes more resistive than the reference, but less so than red. Blue indicates less resistance than the reference. For example, the area in the vicinity of salt domes with brine-saturated sediments might show up blue. White indicates that the ratio of measured amplitude to reference amplitude is approximately unity; i.e., the observed data are the same as the reference data and there is no resistivity anomaly. Other colors complete the range of resistive amplitudes as indicated in the drawings' color scale. The same calibration has been used for the color scale in both drawings, although that does not imply that quantitative determinations should be made from FIG. 2. Shallow structure 1 partly overlaps with deeper structure 2 in map view (structure 2 is deeper). Each structure is resistive and shows red using the reference of FIG. 1. But, in FIG. 1, the anomaly in the common area (red color) is both due to the shallow structure 1 and the deeper structure 2. In FIG. 2, the contribution of shallow resistors (i.e. structure 1) have been removed, the remaining anomaly being due to deeper resistors. The anomaly is still displayed in red because structure 2 is very resistive (much more resistive than structure 1).

FIG. 2, however, is but a two-dimensional map. One can conclude from comparing FIG. 2 to FIG. 1 that the resistive body 3 lies deeper than resistive body 1, but FIG. 2 does not predict how deep anomaly 3 is. On FIG. 2, oil field 3 seems smaller than field 2, while in reality it is much bigger. Because it is deeper, its electromagnetic response is smaller. The present inventive method can go beyond the anomaly mapping 309 that produces a map such as FIG. 2, and estimate the extent, the depth and the magnitude of the resistivity in the deep anomalies, i.e., one can estimate a full 3D volume of resistivity that explains the actually observed data at all frequencies. Deeper seismic interpretation 310 may be used to build the geometry of deeper resistivity bodies 311 in a manner similar to that described in connection with steps 301 and 302 (the shallow resistivity structure 306 is the result of the high-frequency iterative analysis). The initial resistivity in the deep potential anomalies can generally be assumed from regional well control, but the well information is not necessary. The simulated low-frequency data 312 is compared 313 to the observed low-frequency data 308. The deep resistivity values are then adjusted to better fit the actual data. The loop 311 to 313 is repeated until a good agreement is reached between the simulated and the actual data. The final resistivity structure 314 is then a good explanation of the observed data.

If very low source frequencies are available, the process can be repeated for progressively lower frequencies and deeper targets, but a two-step process is generally sufficient considering the narrow frequency bandwidth of present CSEM source waveforms. This process resembles the layer-stripping approaches in seismology and gravimetry, but the physics and the controlling equations are completely different.

The above-described downward continuation modeling approach (forward modeling and comparison of simulated and actual data, which is performed by a human interpreter—see steps 305 and 313) is a time consuming iterative process. It can be fully automated through 1D, 2D or 3D inversion. Basically, the trial and error analysis of loops 302-305 and 311-313 (FIG. 3) are done automatically. For inversion codes, see for instance, Newman G. A., Alumbaugh D. L., *Three dimensional Electromagnetic Modeling and Inversion on Massively Parallel Computers, Sandia Report* SAND96-0582 *Sandia National Laboratories* (1996). To reduce the non-uniqueness of the solution, it is recommended to use as much information as possible (electric and magnetic fields, receivers close to the transmitter line and receivers away the transmitter line). As with forward modeling, the inversion may be done in one, two or three dimensions; the flow chart of FIG. 4 indicates 3D inversion, which gives the best results but is most time consuming and expensive.

The actual high-frequency data 401 are inverted first 402 to estimate the shallow resistivity structure 403 (usually down to 2 or 3 times the skin depth of the lowest high-frequency data). The person of skill in the art will recognize that the inversion technique 402, which is embodied in a software program or module for practical utility, solves the inverse problem to that solved by the forward modeling module or program of step 303. In other words, it solves for the input variables (the resistivity structure) of 303 in terms of the output quantities (electric and magnetic field components as a function of location).

The resulting shallow resistivity model 403 is then used as the starting model or constraint for the inversion of the low-frequency data 404. The low-frequency inversion 405 is performed in a deeper window than the high-frequency inversion (i.e., the shallow structure 403 is not allowed to change), though some overlap may be preferable (typically half to one skin depth at the lowest high frequency). The inversion result is a 3D resistivity model 406 that may show some non-geological roughness at the boundary between the inversion windows. Optionally, one can run a final inversion 407 with both the high-frequency data 401 and the low-frequency data 404 to make sure that the final resistivity model 408 is consistent with all data. Since the starting model 406 should be close to the final solution, this final step is usually quick. The person skilled in the art will understand that the inversions 402, 405, and 407 must be performed by numerical methods, i.e., trial and error. Thus a good first guess at the answer speeds up the process. However, a key point is that the iterative loops performed by the inversion algorithm (not indicated in FIG. 4) can be satisfactorily performed without human intervention, which is not the case with steps 305 and 313, and subsequent adjustment of the resistivity structure, in the forward modeling embodiment of the present invention. For purposes of simplicity of explanation, the inventive method has been described for the embodiment in which two frequency sets are used, a lower frequency data set and a higher frequency data set. However, if the recorded frequency spectrum is wide enough, the inversion loop 404-406 can be run again at even lower frequencies. The widest frequency spectrum obtainable is preferable to reduce the non-uniqueness of the inverted resistivity depth image. Typically, a CSEM source waveform will have a bandwidth of about one decade, i.e., the highest frequency component (in its Fourier decomposition) having significant associated amplitude will have a frequency of about 10× the frequency of the lowest frequency component. To obtain a wider bandwidth (richer in lower or higher frequencies) with the existing sources, the survey must be repeated several times with different waveforms. Economics is a limiting factor in how many times the survey can be repeated to target different depth intervals.

The foregoing description is directed to particular embodiments of the present invention for the purpose of illustrating it. It will be apparent, however, to one skilled in the art, that many modifications and variations to the embodiments described herein are possible. All such modifications and variations are intended to be within the scope of the present invention, as defined by the appended claims.

We claim:

1. A data-processing method for reducing masking effects of shallow resistivity structures on an electromagnetic survey of a subsurface region, comprising:
    (a) selecting a first survey data set generated at a first source frequency, said first source frequency having been selected to penetrate only said shallow resistivity structures;
    (b) selecting a second survey data set corresponding to a second source frequency lower than said first source frequency, thereby revealing deeper lying resistivity structures of the subsurface region as well as said shallow resistivity structures;
    (c) calculating the shallow resistivity structure by solving electromagnetic field equations using the survey data set generated at the first source frequency; and
    (d) using the calculated shallow resistivity structure and the electromagnetic data from the second survey to distinguish shallow response from deeper response.

2. The method of claim 1, wherein the shallow resistivity structure is predicted by:
    (a) assuming an initial shallow resistivity structure;
    (b) calculating a theoretical electromagnetic response for the survey at said first source frequency using electromagnetic field equations and the assumed shallow resistivity structure;
    (c) comparing the calculated response to said first survey data set; and
    (d) adjusting the assumed shallow resistivity structure and repeating steps (b)-(d) as necessary until the calculated response agrees with said first survey data set within a pre-selected tolerance.

3. The method of claim 1, wherein the shallow response is distinguished from the deeper response by:
    (a) calculating a theoretical electromagnetic response for the survey at said second source frequency using electromagnetic field equations and the calculated shallow resistivity structure; and
    (b) comparing the calculated electromagnetic response to the second survey data set to remove contributions to the second survey data set caused by the shallow resistivity structure.

4. The method of claim 2, wherein the initial shallow resistivity structure is obtained from seismic data interpretation by associating said resistivity structure with geologic structure identified from seismic reflection, refraction, or transmission data, and then estimating resistivity values in the seismically identified structure by correlating to seismic impedance.

5. The method of claim 1, wherein the shallow resistivity structure is predicted by inverting electromagnetic wave equations at said first source frequency to solve for resistivity structure corresponding to acquisition parameters and the electromagnetic data set from said first survey.

6. The method of claim 1, further comprising calculating a depth-dependent resistivity structure for said subsurface region from said calculated shallow resistivity structure and an estimated deeper resistivity structure; said depth-dependent resistivity structure containing at least two depth zones corresponding to skin depth of said first and second source frequencies.

7. The method of claim 6, wherein said depth-dependent resistivity structure calculation comprises:
    (a) taking the calculated shallow resistivity structure and supplementing this resistivity model with the estimated deeper resistivity structure to produce an assumed resistivity model covering shallow and deeper regions;
    (b) calculating a theoretical electromagnetic response for the survey at said second source frequency using the electromagnetic field equations and the assumed resistivity model;
    (c) comparing the calculated response to said second survey data set; and
    (d) adjusting the assumed resistivity model and repeating steps (b)-(d) as necessary until the calculated response agrees with said second survey data set within a pre-selected tolerance.

8. The method of claim 6, wherein the estimated deeper resistivity structure is obtained from seismic data interpretation by associating said resistivity structure with geologic structure identified from seismic reflection, refraction, or transmission data, and then estimating resistivity values in the seismically identified structure by correlating to seismic impedance.

9. The method of claim 6, wherein the depth-dependent resistivity structure is calculated by inverting electromagnetic wave equations at said second source frequency to solve for resistivity structure corresponding to acquisition parameters and the electromagnetic data set from said second survey.

10. The method of claim 6, further comprising selecting a third survey data set corresponding to a third source frequency and adding a third depth zone to said calculated depth-dependent resistivity structure, thereby improving depth resolution of sub-surface resistivity structures.

11. The method of claim 10, further comprising repeating the described process to add at least one additional depth zone.

12. The method of claim 3, wherein the shallow resistivity structure contributions are removed from the second survey data set by using the calculated shallow electromagnetic response to scale the second survey data set, position by position.

13. The method of claim 12, wherein the scaled second survey data set is plotted vs. lateral position on a map using a color scale to represent the scaled data.

* * * * *